United States Patent [19]

Inomata et al.

[11] Patent Number: 4,631,796
[45] Date of Patent: Dec. 30, 1986

[54] TORQUE SENSOR AND METHOD FOR MANUFACTURING THE SAME

[75] Inventors: Koichiro Inomata; Takao Sawa; Osamu Arakawa, all of Yokohama, Japan

[73] Assignee: Tokyo Shibaura Denki Kabushiki Kaisha, Kawasaki, Japan

[21] Appl. No.: 536,836

[22] Filed: Sep. 29, 1983

[30] Foreign Application Priority Data

Sep. 30, 1982 [JP] Japan ............... 57-171344
Sep. 30, 1982 [JP] Japan ............... 57-171346
Sep. 30, 1982 [JP] Japan ............... 57-171347

[51] Int. Cl.$^4$ .............. B23P 11/02; G01L 3/02
[52] U.S. Cl. ...................... 29/446; 29/447; 73/862.36
[58] Field of Search .......... 73/DIG. 2, 862.36; 29/446, 447

[56] References Cited

U.S. PATENT DOCUMENTS

| | | | |
|---|---|---|---|
| 4,149,911 | 4/1979 | Clabburn | 29/446 |
| 4,236,946 | 12/1980 | Aboaf et al. | |
| 4,364,278 | 12/1982 | Horter et al. | |
| 4,414,855 | 11/1983 | Iwasaki | 73/DIG. 2 |

FOREIGN PATENT DOCUMENTS

| | | | |
|---|---|---|---|
| 0067974 | 12/1982 | European Pat. Off. | 73/862.36 |
| 1900194 | 7/1970 | Fed. Rep. of Germany | 73/862.36 |

OTHER PUBLICATIONS

"Magnetic Anisotropy of Amorphous $(Fe_{1-x}Co_x)_{78}Si_{10}B_{12}$ Alloys", 2318 *Applied Physics*, vol. 20, No. 2 (1979), pp. 125–127.

K. Harada et al., "A New Torque Transducer Utilizing Amorphous Ribbons," MAG-81-72 (1981) Electrical Society of Japan.

W. J. Flemming et al, "Noncontact Miniature Torque Sensor for Automotive Application," SAE Technical Paper Series, 820206, 1982.

*Primary Examiner*—Howard N. Goldberg
*Assistant Examiner*—Steven Nichols
*Attorney, Agent, or Firm*—Schwartz, Jeffery, Schwaab, Mack, Blumenthal & Evans

[57] ABSTRACT

There are disclosed a torque sensor having a rotary shaft and a thin strip of an amorphous magnetic alloy which has a great magnetic strain constant windingly fixed on the rotary shaft and detecting a torque in a non-contact style by a variation in magnetic properties of the thin strip of the amorphous alloy, characterized in that the amorphous alloy is an iron-based amorphous alloy having a crystallization temperature of 450° C. or more, and a method for manufacturing the same, characterized in that an inductive magnetic anisotropy had been previously given to the thin strip and then the thin strip is windingly fixed on the rotary shaft.

The torque sensor according to the present invention permits measuring a large torque with a good accuracy in an extensive temperature, and is manufactured with ease.

9 Claims, 7 Drawing Figures

FIG.1
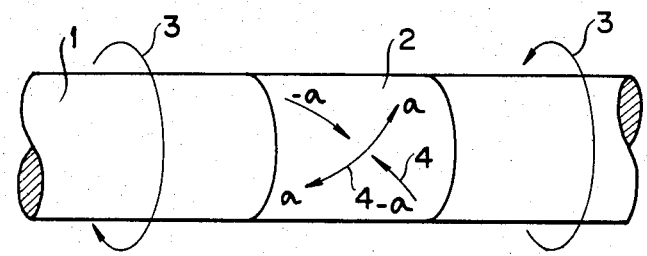
FIG.2
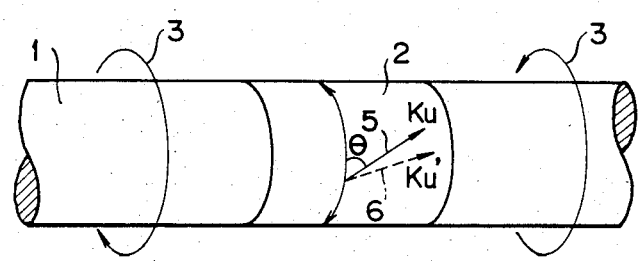
FIG.3a  FIG.3b  FIG.3c
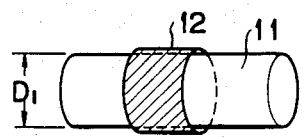 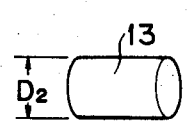 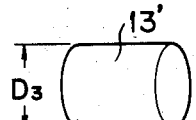
High Temperature   Low Temperature
FIG.3d
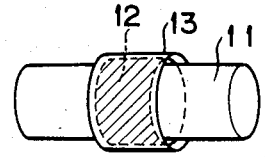
$D_3 > D_1 > D_2$

TORQUE SENSOR AND METHOD FOR MANUFACTURING THE SAME

BACKGROUND OF THE INVENTION

This invention relates to a torque sensor and a method for manufacturing the same, more particularly to a torque sensor which permits measuring a large torque with a good accuracy in an extensive temperature range, and a method for manufacturing such a torque.

In recent years, it has been required to accurately detect a torque of a rotary member. For this requirement, a non-contact system, where a detector is not brought into contact with the rotary member, is suitable.

Heretofore, as the non-contact systems, there have been attempted an indirect system by which a torosion angle in a shaft is detected with the aid of beam or magnet to indirectly measure the torque, and a direct system in which a magnetic element is disposed on the rotary member and the torque is detected by the utilization of a magnetic strain phenomenon caused by the rotation of the magnetic element. However, they cannot be used practically.

As compared with the indirect system, the aforesaid direct system permits easily detecting the torque in stationary, normally rotating and reversely rotating states, and it is thus preferable from the viewpoint of usefulness. However, in the case of the conventional direct systems, it is difficult to detect the accurate torque because of the ununiformity of magnetic properties of the magnetic element.

Now, a torque sensor has lately been suggested by which the torque is directly detected in a non-contact style by the utilization of magnetic strain properties of an amorphous magnetic alloy (Data for Magnetics Study Meeting in Denki Gakkai, MAG-81-71).

Referring to the instant torque sensor, a thin strip of an amorphous magnetic alloy having great magnetic strain properties is wound and fixed on a rotary shaft so that the strain in the shaft caused by the torque may be introduced into the thin strip above, and a variation in the magnetic properties of the thin strip by a magnetic strain phenomenon is detected in the non-contact style from outside, thereby measuring the torque. In order to provide the thin strip of the amorphous magnetic alloy with great magnetic strain properties (inductive magnetic anisotropy), the annular magnetic core of the amorphous magnetic alloy thin strip is first prepared so that its diameter may conform to the diameter of the rotary shaft and is then subjected to heat treatment to remove an internal stress from the thin strip. Afterward, this thin strip is adhesively fixed on the rotary shaft which is distorted, and the torsion therein is then cancelled by a return operation, thereby providing the thin strip with the inductive magnetic anisotropy.

The above-mentioned torque sensor will be described in brief with reference to accompanying drawings.

As shown in FIG. 1, the aforesaid torque sensor has an annular magnetic core 2 comprising an amorphous magnetic alloy thin strip insertedly fixed around a rotary shaft 1. Now, when a torque 3 is applied to the rotary shaft 1, a strain stress will occur therein at an angle of ±45° to the lengthwise axis thereof, so that a strain stress σ4 will occur also in the annular magnetic core 2 absolutely fixed on the rotary shaft 1, at an angle of ±45° to the lengthwise axis thereof, as shown in FIG. 1. Further, if the annular magnetic core is used to which uniaxial anisotropy Ku 5 is applied, for example, at an angle of $\theta = 45°$ as shown in FIG. 2, the anisotropy Ku 5 will be changed into Ku' 6 by the strain stress σ which has been caused by the application of the above-mentioned torque 3. Therefore, the torque applied to the rotary shaft can be measured by electrically detecting a change amount of the above-mentioned uniaxial anisotropy.

In the aforesaid torque sensor, when the thin strip of the amorphous magnetic alloy which has a great magnetic strain constant and a high saturated megnetization has been used, an output voltage to be detected will become large, which fact advantageously permits its measurement with a high accuracy. Further, if a great torque $T_0$ is previously applied to the thin strip of the amorphous magnetic alloy, a greater torque T can also advantageously be detected.

However, the torque sensor described above suffers certain disadvantages, in part because the amorphous magnetic alloy used (trade name: Metaglas 2826MB; available from U.S. Allied Co., Ltd.; $Fe_{40}Ni_{38}Mo_4B_{18}$) is poor in its performance. That is to say, when the thin strip comprising such a poor amorphous magnetic alloy is used as an annular magnetic core and when a heat treatment of the thin strip is carried out to remove an internal stress therefrom, the thin strip of the amorphous alloy itself will become very brittle. As a result, it has problems that some cracks tend to occur at a time of a torque measurement, and when a great torque $T_0$ is applied to the thin strip of the amorphous magnetic alloy with the aim of detecting a great torque, some crack will occur in the annular magnetic core consisting of the thin strip of the amorphous magnetic alloy.

Moreover, fixing the thin strip of the amorphous magnetic alloy on the rotary shaft is carried out with the aid of an adhesive such as a synthetic resin. Therefore, if it is attempted to detect the torque in the range of an elevated temperature, the adhesion between the alloy thin strip and the rotary shaft will deteriorate along with temperature raise. For this reason, the stress in the rotary shaft will not be accurately transmitted to the thin strip of the amorphous magnetic alloy, and a detection output for the torque will fluctuate, which fact will lead to the deterioration in the detection accuracy of the torque.

Further, in a manufacturing process, it is required to prepare the annular magnetic core the diameter of which is previously caused to conform to the diameter of the rotary shaft, and a torsion must be applied to the rotary shaft. These requirements make the manufacturing process intricate.

SUMMARY OF THE INVENTION

An object of this invention is to provide a torque sensor by which the above problems are eliminated and in which an output fluctuation does not occur within the extensive temperature range of $-30°$ to $150°$ C. or so, it is possible to detect a great torque, and the torque detection can be carried out with a high accuracy.

Another object of this invention is to provide a method for manufacturing a torque sensor with ease.

The inventors of this invention have conducted intensive research on the torque sensor having the aforesaid thin strip of the amorphous magnetic alloy, and they have found that the objects above can be accomplished by emloying an iron-based amorphous magnetic alloy having a high crystallization temperature as an amorphous magnetic alloy.

That is to say, in a torque sensor which has a rotary shaft and a thin strip of an amorphous magnetic alloy windingly fixed on the rotary shaft and having a great magnetic strain constant and which detects a torque in a non-contact style on the basis of a variation in magnetic properties of the thin strip of the amorphous magnetic alloy, this invention is characterized in that the amorphous magnetic alloy is an iron-based amorphous alloy having a crystallization temperature of 450° C. or more.

BRIEF DESCRIPTION OF THE DRAWINGS

FIGS. 1 and 2 are elevational views illustrating the principle of a non-contact type torque sensor according to this invention;

FIGS. 3(a) to 3(d) are elevational views illustrating the fixing steps by which a thin strip of an amorphous magnetic alloy regarding this invention is fixed on a rotary shaft by the use of a shape-memory alloy fixing material.

DETAILED DESCRIPTION OF PREFERRED EMBODIMENTS

Figure 4:
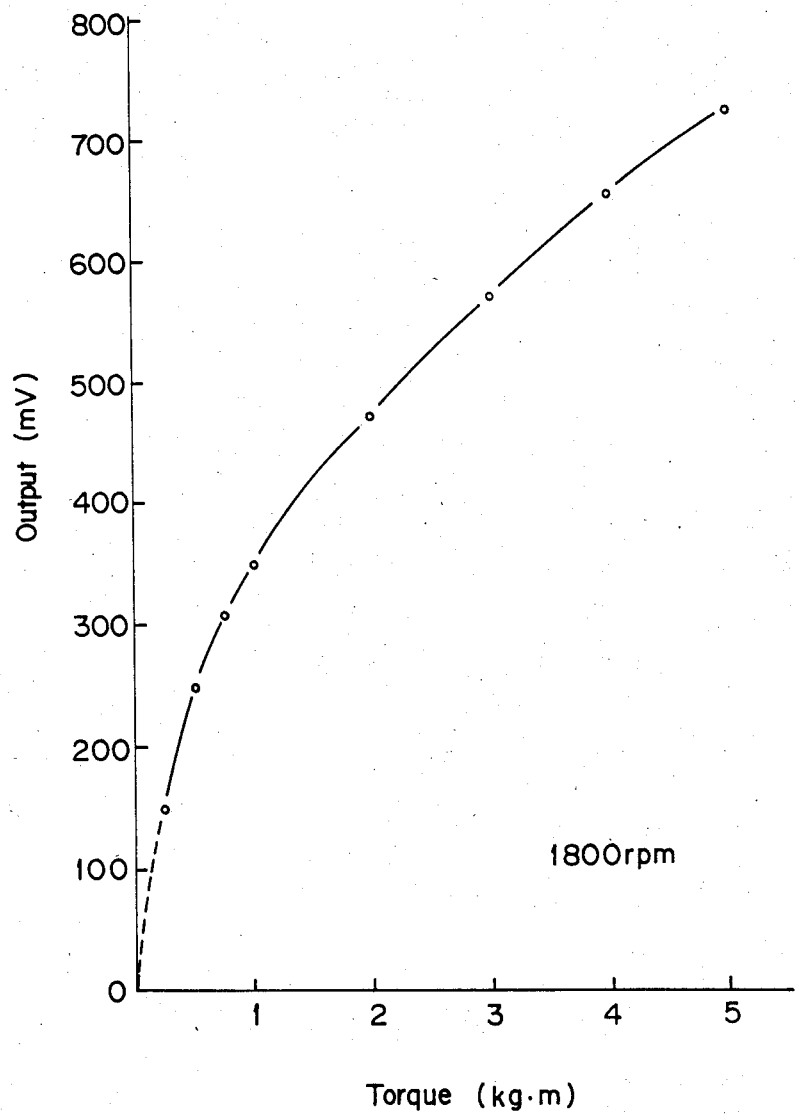
FIG. 4 is a diagram illustrating dynamic torque detection properties of the torque sensor according to this invention.

The iron-based amorphous magnetic alloy to be used in this invention include optional types thereof so long as they have the crystallization temperature of 450° C. or more. When the crystallization temperature of the alloy is less than 450° C. and when annular magnetic core of the thin strip of the amorphous magnetic alloy is subjected to a heat treatment in order to remove an internal stress therefrom, the alloy will become very brittle. Therefore, if it is attempted that a large torque $T_0$ is previously applied to the thin strip, some cracks will appear thereon, and finally the detection of the large torque will become impossible.

As the iron-based amorphous magnetic alloy to be used in this invention, alloys represented by the following formula are preferable:

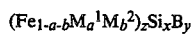

$(Fe_{1-a-b}M_a^1 M_b^2)_z Si_x B_y$ wherein
M¹ is Co and/or Ni; M² is at least one selected from the group consisting of Ti, V, Cr, Mn, Y, Zr, Nb, Mo, Hf, Ta and W; a is in the range of $0 \leq a \leq 0.2$; b is in the range of $0 \leq b \leq 0.1$; and x, y and z are numbers satisfying the relations of $0 \leq x \leq 20$, $5 \leq y \leq 30$ and $x+y+z=100$, respectively.

Each M¹ and M² in the formula has a function of raising the crystallization temperature of the alloy, but when the content of the M¹ or M² exceeds a certain limited level, the magnetic strain constant thereof will become small and the saturated magnetization will also become small, and for these reasons, the alloy will lose practicability. The composition ratio a of the M¹ is preferably within the range of $0 \leq a \leq 0.2$, and b of the M² is preferably within the range of $0 \leq b \leq 0.1$.

The Si in the above formula also has the function of raising the crystallization temperature of the alloy similarly to the M, but when the composition ratio x of the Si exceeds the above-mentioned level, it will become hard to prepare the amorphous alloy.

Further, the B in the above formula is essential to render the alloy amorphous at a manufacturing step, and the composition ratio y of the B is preferably within the range of $5 \leq y \leq 30$. If the y is less than 5, it will be hard to obtain the amorphous alloy having a crystallization temperature of 450° C. or more; if it is in excess of 30, it will be difficult to make the alloy amorphous.

With regard to the thin strip of the amorphous magnetic alloy used in this invention, a thinner one is preferable, and it is preferred that its average thickness, which has been calculated on the basis of weight and specific gravity, is 20 μm or less. When the thickness of the amorphous alloy exceeds 20 μm, the adhesion between the thin strip of the amorphous magnetic alloy and the rotary shaft will become insufficient, whereby the measurement accuracy of the torque to be detected will deteriorate.

Furthermore, it is preferred that the above iron-based amorphous alloy practically has an absolute value of a magnetic strain constant of $5 \times 10^{-6}$ or more. When the absolute value of the magnetic strain constant thereof is less than $5 \times 10^{-6}$, a variation in a magnetic permeability caused with the torque will be small, so that a sufficiently great output voltage will not be obtained.

The torque sensor according to this invention may be manufactured by fixing the above thin strip of the iron-based amorphous magnetic alloy on the rotary shaft by the use of an adhesive, but the sensor is preferably made by wrapping the shaft in a shape-memory alloy and by fixing the strip on the shaft with the aid of the shape-memory function of the shape-memory alloy fixing material.

Examples of the shape-memory alloys to be used in this invention include an alloy consisting of Au-Cd, Cu-Al-Ni, Cu-Al-Zn, Cu-Sn, In-Tl, Ni-Al and Ni-Ti, and they are employed alone or in combination of two or more kinds thereof.

Fixing the thin strip of the amorphous magnetic alloy on the rotary shaft with the shape-memory alloy fixing material can be carried out as follows:

Referring now to FIGS. 3(a) to 3(d), the thin strip of the amorphous magnetic alloy 12 is first wound on the rotary shaft 11 having a diameter of $D_1$ (FIG. 3(a)). On the other hand, the shape-memory alloy is molded at a temperature (high temperature) of its modification point or more to prepare a cylindrical member 13 having a smaller diameter $D_2$ than the diameter $D_1$ of the rotary shaft 11 (FIG. 3(b)). Next, the cylindrical member 13 is expanded in the diameter thereof at a temperature (low temperature) of its modification point or less in order to prepare a cylindrical member 13' having a larger diameter $D_3$ than the diameter $D_1$ of the rotary shaft 11 (FIG. 3(c)). The rotary shaft 11 is then inserted into the cylindrical member 13' so that the thin strip of the amorphous magnetic alloy 12 around the shaft 11 may be surrounded with the cylindrical member 13, and the whole of them is subjected to the temperature of the modification point or more. As a result, it is attempted that the cylindrical member 13' shrinks toward the original cylindrical member 13 having a diameter $D_2$ by the shape-memory function of the shape-memory alloy, so that the thin strip of the amorphous magnetic alloy 12 is securely fixed on the rotary shaft 11, being wrapped in the cylindrical member 13 (FIG. 3(d)). Supplying the thin strip of the amorphous magnetic alloy 12 with an inductive magnetic anisotropy may be carried out before the thin strip of the amorphous magnetic alloy 12 will be wound on the rotary shaft, or after it has been wound thereon.

As for the thus prepared cylindrical member comprising the shape-memory alloy, its diameter is never expanded above the level of $D_1$ any more even at any temperature except for a thermal expansion, therefore the cylindrical member permits the measurement of the torque in an extensive temperature range and the noticeable improvement in the detection accuracy of the torque.

The shape-memory alloy fixing material used in the torque sensor according to this invention may take any shape such as ring or spiral, in addition to the cylindrical shape. A thickness of the shape-memory alloy fixing material depends on a mechanical strength required at the time of its use. With regard to the torque sensor according to this invention, a space between the thin strip of the amorphous magnetic alloy and a detecting coil disposed adjacent to the periphery thereof is required to be as small as possible in order to obtain as much as a detection output as possible. Hence, it is also preferred that the shape-memory alloy fixing material, which is interposed therebetween, is formed as thin as possible.

Now, the manufacturing method of the torque sensor according to this invention will be described.

In a method for manufacturing a torque sensor which has a rotary shaft and a thin strip of an amorphous magnetic alloy windingly fixed on the rotary shaft and having a great magnetic strain constant and which detects a torque in a non-contact style on the basis of a variation in magnetic properties of the thin strip of the amorphous magnetic alloy, the method according to this invention is characterized in that after an inductive magnetic anisotropy has been previously given to the thin strip of the amorphous magnetic alloy, the thin strip is windingly fixed on the rotary shaft.

Supplying previously the thin strip of the amorphous magnetic alloy with the inductive magnetic anisotropy can be carried out, for example, by heating the thin strip while a direct current magnetic field is externally applied to the thin strip of the amorphous magnetic alloy at a certain angle $\alpha$ to the lengthwise axis thereof. An intensity of the magnetic field to be applied depends on the shape of the thin strip of the amorphous magnetic alloy, but it is such that the magnetization of the amorphous magnetic alloy is enough saturated, and it is approximately 100 Oe or more. The heating temperature is required to be the crystallization temperature or less of the amorphous magnetic alloy, because if it exceeds the crystallization temperature thereof, the alloy will become poor in its magnetic properties and will also become brittle. Further, the aforesaid angle $\alpha$ is preferably in the vicinity of 45°, because the maximum output of the torque sensor can be obtained when the angle $\alpha$ is 45°.

In the manufacturing method of this invention, the amorphous alloys represented by the aforesaid formula:

$$(Fe_{1-a-b}M_a^1 M_b^b)_z Si_x B_y$$

where $M^1$, $M^2$, a, b, x, y and z have the same meanings as defined above, is preferably employed.

Now, this invention will be further described in detail in accordance with examples.

EXAMPLES 1 TO 13

Thin strip of amorphous magnetic alloys having the respective compositions exhibited in the following table were prepared under a single roll system. The obtained thin strips each had a width of approximately 10 mm and an average sheet thickness of approximately 18 μm. For each thin strip of the amorphous magnetic alloy, a crystallization temperature (Tx) was measured on the condition of a temperature raising rate of 10° C./min by the use of a differential thermal analyzer (DTA), and a magnetic strain constant (λs) was measured by using a strain gauge method. Their results are also exhibited in the following table.

Next, each thin strip of the amorphous magnetic alloy was wound on a rotary shaft so that the diameter of the strip might conform to that (10 mm) of the rotary shaft, in order to prepare annular magnetic cores. For the purpose of removing an internal stress from the cores, they were then subjected to a heat treatment. Afterward, each rotary shaft was inserted into the annular magnetic core. With the intention of measuring a torque T up to 5 Kg·m, each annular magnetic core was fixed on the shaft with an adhesive while a torsion was applied to the shaft, and the torsion in the shaft was then canceled by a return operation in order to provide the annular magnetic core with an inductive magnetic anisotropy Ku. In this way, torque sensors were obtained.

For each torque sensor thus obtained, a dynamic torque was detected by rotating the shaft to vary the torque. Outputs (mV) in the case that the torque T to be measured was 5 Kg·m are also set forth in the following table. Further, with regard to the torque sensor of Example 1, its dynamic torque detection properties are set forth in FIG. 4.

COMPARATIVE EXAMPLES 1 TO 3

The thin strip of the amorphous magnetic alloy having the respective compositions exhibited in the following table were prepared in the same manner as in Examples 1 to 13. For each amorphous magnetic alloy thin strip, a crystallization temperature (Tx) and a magnetic strain constant (λs) were measured in the same manner as in the previous examples. Their results are also set forth in the following table.

Next, annular magnetic cores were prepared in the same manner as in the previous examples and were subjected to a heat treatment, and each rotary shaft was inserted into the annular magnetic core. When it was attempted to provide each annular magnetic core with an inductive magnetic anisotropy in the same manner as in the previous examples, some cracks occured on every annular magnetic core of these comparative examples. In the following table, there are also set forth values of torques $T_0$ applied to the annular magnetic cores at the time of occurrence of the cracks in Comparative Examples 1 to 3.

TABLE

| | Composition | Tx (°C.) | $\lambda_s$ ($\times 10^{-6}$) | Torque $T_0$ at crack occurance (Kg·m) | Output at torque T = 5 Kg·m (mV) |
|---|---|---|---|---|---|
| Example 1 | $(Fe_{0.985}Nb_{0.015})_{81}Si_6B_{13}$ | 510 | 25 | — | 725 |
| Example 2 | $(Fe_{0.98}Ti_{0.02})_{81}Si_6B_{13}$ | 490 | 27 | — | 710 |
| Example 3 | $(Fe_{0.98}V_{0.02})_{81}Si_6B_{13}$ | 480 | 27 | — | 690 |
| Example 4 | $(Fe_{0.97}Cr_{0.03})_{78}Si_8B_{14}$ | 510 | 30 | — | 650 |
| Example 5 | $(Fe_{0.97}Mn_{0.03})_{78}Si_{10}B_{12}$ | 510 | 32 | — | 670 |
| Example 6 | $(Fe_{0.9}Co_{0.1})_{78}Si_{13}B_9$ | 520 | 40 | — | 700 |
| Example 7 | $(Fe_{0.8}Ni_{0.2})_{78}Si_{13}B_9$ | 510 | 24 | — | 680 |
| Example 8 | $(Fe_{0.99}Y_{0.01})_{78}Si_{12}B_{10}$ | 530 | 35 | — | 680 |
| Example 9 | $(Fe_{0.98}Zr_{0.02})_{78}Si_{11}B_{11}$ | 530 | 33 | — | 670 |
| Example 10 | $(Fe_{0.98}Mo_{0.02})_{80}Si_{10}B_{10}$ | 520 | 25 | — | 670 |
| Example 11 | $(Fe_{0.96}Hf_{0.04})_{80}Si_{10}B_{10}$ | 520 | 22 | — | 680 |
| Example 12 | $(Fe_{0.97}Ta_{0.03})_{75}Si_{10}B_{15}$ | 560 | 31 | — | 640 |
| Example 13 | $(Fe_{0.98}W_{0.02})_{75}Si_{10}B_{15}$ | 560 | 33 | — | 640 |
| Comparative Example 1 | $Fe_{40}Ni_{38}Mo_4B_{18}$ | 390 | 10 | 1 | — |
| Comparative Example 2 | $(Fe_{0.4}Ni_{0.6})_{78}Si_8B_{14}$ | 420 | 8 | 1.5 | — |
| Comparative Example 3 | $(Fe_{0.49}Ni_{0.48}Nb_{0.03})_{82}B_{18}$ | 400 | 9 | 1.2 | — |

As the above table indicates, the amorphous magnetic alloys all used in the torque sensors of Examples 1 to 13 had crystallization temperatures Tx of 450° C. or more and thus they did not become brittle even when the heat treatment (e.g., at 450° C. for 10 minutes in Example 1) was carried out for the sake of the removal of the internal stress therefrom. Therefore, no cracks appeared on any magnetic cores even when a great torque $T_0$ was applied to them, and the detection of the torque could be satisfactorily carried out up to a level of 5 Kg·m in the experimental range.

On the contrary, the amorphous magnetic alloys all used in the torque sensors of Comparative Examples 1 to 3 had crystallization temperature Tx of less than 450° C., and they became brittle when the heat treatment (e.g., at 370° C. for 30 minutes in Comparative Example 1) was carried out for the sake of the removal of the internal stress therefrom. Therefore, some cracks occured thereon when a great torque $T_0$ was applied to them, for this reason it was impossible to detect the torque.

EXAMPLE 14

First, by a single-roll process, a thin strip of an amorphous magnetic alloy $[(Fe_{0.985}Nb_{0.015})_{81}Si_6B_{13}]$ was prepared which had a width of 10 mm and a sheet thickness of approximately 20 μm. Next, this thin strip was once wound on a rotary shaft having a diameter of 30 mm and was fixed thereon at the edge portions thereof with an adhesive.

Further, a thin plate, of a shape-memory alloy Ni-Ti (modification point: 60° C.), having a thickness of 0.1 mm was wound on the rotary shaft at a temperature of 70° C. in order to prepare a cylindrical member of 29 mm in diameter. Afterward, the diameter of this cylindrical member was expanded at room temprature up to a level of the diameter of the rotary shaft, 30 mm or more.

Next, the rotary shaft was inserted into the cylindrical member of the shape-memory alloy so that the thin plate on the shaft might be surrounded with the cylindrical member, while a torsion was applied to the rotary shaft, and the whole of them was exposed at a temperature of 70° C. As a result, the cylindrical member of the shape-memory alloy Ni-Ti worked so as to shrink by its shape-memory function up to the original diameter of 29 mm, and the thin strip of the amorphous magnetic alloy was thus wrapped in the cylindrical member of the shape-memory alloy and was firmly fixed on the rotary shaft. Afterward, the torsion in the rotary shaft was canceled by a return operation, whereby an inductive magnetic anisotropy was given to the thin strip of the amorphous magnetic alloy.

By the use of the thus obtained torque sensor in which the thin strip of the amorphous magnetic alloy was surroundedly fixed on the rotary shaft by the cylindrical member of the shape-memory alloy, the dynamic torque of the rotary shaft was detected within the temprature range of −30° to 150° C. on the basis of the principle explained in FIGS. 1 and 2. As a result, it was found that according to the torque sensor in which the above-mentioned shape-memory alloy was used, the error of the dynamic torque in the above temperature range was ±1% or less, though in the case of the torque sensor in which the thin strip of the amorphous magnetic alloy was fixed on the rotary shaft only by the conventional adhesive, the error of the dynamic torque in the above temperature range was ±10% or so.

EXAMPLE 15

First, by a single-roll process, a thin strip of an amorphous magnetic alloy $[(Fe_{0.985}Nb_{0.015})_{81}Si_6B_{13}]$ was prepared which had a width of 10 mm and an average sheet thickness of 18 μm. Next, a portion, of the thin strip, having a length of 10 cm was cut our therefrom, and a direct current magnetic field of 2 KOe was applied to the strip portion at an angle of 45° to the lengthwise axis thereof. A heat treatment was then carried out at a temperature of 300° C. for a period of 20 minutes. This sample was magnetized along its lengthwise axis to measure a magnetizing curve, and it thus was confirmed that an inductive magnetic anisotropy was given to the sample at an angle of 45° to the lengthwise axis of the strip. Afterward, the amorphous magnetic alloy, to which the inductive magnetic anisotropy was given in this way, was wound and adhesively secured on the rotary shaft.

The thus manufactured torque sensor was used, the shaft was rotated, and a torque was accordingly varied, thereby detecting a dynamic torque. Obtained results were about the same as in FIG. 4, and it was confirmed that the torque could be detected.

Also with regard to amorphous magnetic alloys other than the amorphous magnetic alloy [$(Fe_{0.985}Nb_{0.015})_{81}Si_6B_{13}$] used in the aforesaid examples, similar results were obtained.

As will be definite from the foregoing, according to this invention, a great torque can be detected within an extensive temperature range and with a high accuracy, therefore industrially very practical torque sensors can be provided.

Further, according to this invention, a method can be provided by which non-contact type torque sensors can be manufactured by simple and easy processes.

We claim:

1. A method for manufacturing a torque sensor (i) which has a rotary shaft and a thin strip comprised of an amorphous magnetic alloy windingly fixed on the rotary shaft, said strip having a large magnetic strain constant, and (ii) which detects a torque in a non-contact style on the basis of a variation in magnetic properties of the thin strip, comprising the steps of (A) imparting an inductive magnetic anisotropy to said thin strip and then (B) windingly fixing the thin strip on the rotary shaft.

2. A method for manufacturing a torque sensor according to claim 1, wherein said thin strip comprises an amorphous alloy represented by the following formula:

$$(Fe_{1-a-b}M_a^1M_b^2)_zSi_xB_y$$

wherein
$M^1$ is Co and/or Ni; $M^2$ is at least one selected from the group consisting of Ti, V, Cr, Mn, Y, Zr, Nb, Mo, Hf, Ta and W; a is in the range of $0 \leq a \leq 0.2$; b is in the range of $0 \leq b \leq 0.1$; and x, y and z are numbers satisfying the relations of $0 \leq a \leq 20$, $5 \leq y \leq 30$ and $x+y+z=100$, respectively.

3. A method for manufacturing a torque sensor according to claim 1 wherein said amorphous alloy has an absolute value of a magnetic strain constant of at least $5 \times 10^{-6}$.

4. A method for manufacturing a torque sensor according to claim 1, wherein said thin strip of the amorphous magnetic alloy is fixed on said rotary shaft by a shape-memory function of a shape-memory alloy fixing material which wraps said thin strip.

5. A methed for manufacturing a torque sensor according to claim 1, wherein said shape-memory alloy is selected from the group consisting of Au-Cd, Cu-Al-Ni, Cu-Al-Zn, Cu-Sn, In-Tl, Ni-Al and Ni-Ti.

6. A method for manufacutring a torque sensor according to claim 1, wherein step (A) comprises heating the thin strip in an external magnetic field applied at a predetermined angle to the lengthwise axis of the thin strip.

7. A method for manufacturing a torque sensor according to claim 6, wherein said magnetic field is at least about 100 Oe.

8. A method for manufacutirng a torque sensor according to claim 6, wherein the thin strip is heated to a temperature no higher than the crystallization temperature of said amorphous magnetic alloy.

9. A method for manufacturing a torque sensor according to claim 6, wherein said predetermined angle is about 45°.

* * * * *